US 6,741,223 B2

(12) United States Patent
Kobayashi et al.

(10) Patent No.: US 6,741,223 B2
(45) Date of Patent: May 25, 2004

(54) DISPLAY DEVICE FOR VEHICLE

(75) Inventors: Masahide Kobayashi, Wako (JP);
Tatsuya Akimaru, Niiza (JP); Keisuke Wada, Asaka (JP); Hajime Yamada, Kawagoe (JP); Shoji Nakauchi, Asaka (JP); Tomohiro Komori, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 117 days.

(21) Appl. No.: 10/163,299

(22) Filed: Jun. 7, 2002

(65) Prior Publication Data
US 2002/0186228 A1 Dec. 12, 2002

(30) Foreign Application Priority Data
Jun. 11, 2001 (JP) ...................................... P2001-175795

(51) Int. Cl.$^7$ ................................................. G09G 5/00
(52) U.S. Cl. ................................ 345/7; 345/9; 345/634
(58) Field of Search ........................... 345/7, 8, 9, 629, 345/630, 634, 635, 636

(56) References Cited
U.S. PATENT DOCUMENTS
5,371,510 A * 12/1994 Miyauchi et al. ............... 345/7
6,222,447 B1 * 4/2001 Schofield et al. ............... 345/7

FOREIGN PATENT DOCUMENTS
EP  0 646 823 A2  9/1994
JP  64-52533      2/1989

* cited by examiner

Primary Examiner—Matthew Luu
(74) Attorney, Agent, or Firm—Sughrue Mion, PLLC

(57) ABSTRACT

A display device for vehicles which is capable of reducing fatigue of the driver due to driving a vehicle. The display device includes a display unit capable of displaying a three dimensional image by shifting the position of a real image and a virtual image in a front and back direction, and a total control unit which controls a display content of the display unit. The total control unit includes a vehicle condition determination unit which determines the condition of the vehicle based on internal and external information data; an information selection unit which selects information data to be displayed from the internal and external information data based on the condition of the vehicle determined by the vehicle condition determination unit; and a display control unit which displays internal and external information data selected by the information selection unit using real images and virtual images, respectively.

12 Claims, 13 Drawing Sheets

DISPLAY DEVICE FOR VEHICLE

BACKGROUND OF THE INVENTION

1. Field of the Invention

The present invention relates to display devices for a vehicle. More specifically, the present invention relates to a display device for a vehicle which is capable of displaying a three dimensional (stereoscopic) image using a real image and a virtual image.

2. Description of Related Art

Japanese Unexamined Patent Application, First Publication No. Sho 64-52533 discloses a double reflection type virtual image display for vehicles which displays a three dimensional image using real images and virtual images. The display includes a first display, a half mirror, a reflection plate, and a second display. The first display is disposed so as to face the driver and displays a real image to the driver. The half mirror is provided with the first display which is disposed so as to be inclined towards the driver. The reflection plate is disposed at an upper position so as to oppose the half mirror and so as not to block the driver's view. The second display displays a virtual image on the half mirror by projecting an image onto the reflection plate. In the above display for vehicles, virtual images are displayed at interior positions as compared with the positions of real images in the depth direction by increasing the distance between the half mirror, the reflection plate, and the second display, which is used for displaying virtual images, as compared with the distance between the half mirror and the first display. As a result, three dimensional images can be displayed by combining the real images with the virtual images.

However, in the above-mentioned publication, it is not explicitly disclosed what kind of information is displayed in what way. Accordingly, there is a danger that information necessary for a driver to read may not be clearly displayed for the driver if the selection of information data, which are displayed by using real images or virtual images, is incorrectly made. If the information necessary for the driver to read is not clearly displayed on the display, the driver has to spend unnecessary labor for monitoring or reading the displayed information, and the driver's fatigue due to driving the vehicle may be increased by these actions. Accordingly, the manner in which the display content of real images and virtual images are selected and displayed is quite important.

SUMMARY OF THE INVENTION

The present invention takes into consideration the above-mentioned circumstances, and has an object to provide a display device for vehicles which is capable of reducing fatigue of a driver due to driving the vehicle. Other objects and features of the invention will be understood from the following description with reference to the accompanying drawings.

In order to achieve the above objects, the present invention provides a display device for a vehicle which includes a display unit (for instance, display units 12 and 54 explained in embodiments described below) which is capable of displaying a three dimensional image by shifting a position of a real image and a position of a virtual image in a front and back direction; and a total control unit (for instance, a CPU 13 explained in the embodiments described below) which controls a display content of the display unit.

The total control unit includes a vehicle condition determination unit (for instance, a vehicle condition determination unit 30 explained in the embodiments described below) which determines the condition of the vehicle based on internal information data including at least vehicle speed information and external information data including at least information on another vehicle running in front of the vehicle; an information selection unit (for instance, an information selection unit 31 explained in the embodiments described below) which selects information data to be displayed on the display unit from the internal information data and the external information data based on the condition of the vehicle determined by the vehicle condition determination unit; and a display control unit (for instance, a display control unit 32 explained in the embodiments described below) which displays internal information data selected by the information selection unit on the display unit using real images, and external information data selected by the information selection unit on the display unit using virtual images.

According to the display device for a vehicle described above, when the vehicle condition determination unit determines the condition of the vehicle based on the internal information data including at least vehicle speed information and the external information data including at least information on another vehicle running in front of the vehicle, the information selection unit selects information data to be displayed on the display unit from the internal information data and the external information data based on the condition of the vehicle determined by the vehicle condition determination unit. Then, the display control unit displays internal information data selected by the information selection unit on the display unit using real images, and external information data selected by the information selection unit on the display unit using virtual images. By displaying the internal information data containing at least the vehicle speed information, i.e., information data particularly required to be read or understood by the driver, using real images in this manner, and the external information data including at least the information on a car in front, i.e., the information which may be better to be sensuously understood by the driver, using virtual images, it becomes possible to display the internal information more clearly.

In another aspect of the present invention, the display unit displays the real images in front of the virtual images.

According to the display device for a vehicle described above, since the display unit displays the real images in front and the virtual images at the back of the real images, it becomes possible to display the internal information more clearly by displaying the internal information data containing at least the vehicle speed information, i.e., the information data particularly required to be read or understood by the driver, in front using real images, and the external information data including at least the information on a car in front, i.e., the information which may be better sensuously understood by the driver, at the back using virtual images.

In yet another aspect of the present invention, the display unit (for instance, the display unit 12 explained in the embodiments described below) includes: a first display (for instance, a first display 17 explained in the embodiments described below) which displays a real image; a half mirror (for instance, a half mirror 18 explained in the embodiments described below) which is disposed at a driver side with respect to the first display; a total reflection mirror (for instance, a total reflection mirror 19 explained in the embodiments described below) which is disposed below and in the vicinity of the half mirror; and a second display (for instance, a second display 20 explained in the embodiments described below) which is disposed at the driver side with respect to the total reflection mirror and displays virtual images on the half mirror by projecting images onto the total reflection mirror.

According to the display device for a vehicle described above, since the half mirror is disposed at the driver side of the first display, and the total reflection mirror and the second display are disposed substantially below the half mirror and the first display, the display unit does not protrude towards the front glass side. Hence, it becomes possible to prevent the display unit from interfering with the driver's view.

In yet another aspect of the present invention, the display unit (for instance, the display unit 54 explained in the embodiments described below) includes: a display (for instance, a display 55 explained in the embodiments described below) which includes a display area for displaying real images (for instance, a display area 56 for displaying real images explained in the embodiments described below) and a display area for displaying virtual images (for instance, a display area 57 for displaying virtual images explained in the embodiments described below), the display area for displaying virtual images being disposed at a driver side with respect to the display area for displaying real images; a total reflection mirror (for instance, a total reflection mirror 60 explained in the embodiments described below) which reflects a display content of the display area for displaying real images; and a half mirror (for instance, a half mirror 61 explained in the embodiments described below) which reflects a display content of the display area for displaying virtual images.

According to the display device for a vehicle described above, since real images and virtual images are displayed by using a display having a display area for displaying real images and a display area for displaying virtual images, which is disposed at the driver side with respect to the display area for displaying real images, only one display is necessary for displaying images.

In yet another aspect of the present invention, the display device for a vehicle further includes: a second display area for displaying virtual images (for instance, a display area 58 for displaying virtual images explained in the embodiments described below) which is disposed in the vicinity of a corner of the display area for displaying real images; and a second half mirror (for instance, a half mirror 62 explained in the embodiments described below) which reflects a display content of the second display area for displaying virtual images.

According to the display device for a vehicle described above, since the second display area for displaying virtual images is disposed in the vicinity of a corner of the display area for displaying real images and the second half mirror reflects a display content of the second display area for displaying virtual images, it becomes possible to increase the variation of displaying virtual images.

In yet another aspect of the present invention, the display control unit controls, when only internal information data selected by the information selection unit is displayed on the display unit by the display control unit using real images and this display state is changed to contain external information data in addition to the internal information data, so that a display position of the internal information data is shifted with respect to a display position of the external information data.

According to the display device for a vehicle described above, since the display control unit controls, when only internal information data selected by the information selection unit is displayed on the display unit by the display control unit using real images and this display state is changed to contain external information data in addition to the internal information data, so that a display position of the internal information data is shifted with respect to a display position of the external information data, it becomes possible to display both the internal information data and the external information data without being interfered with each other, and both the internal information data and the external information data can be clearly displayed in an excellent manner.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Hereinafter, a display device for vehicles according to an embodiment of the present invention will be described in detail with reference to the accompanied drawings.

Figure 1:
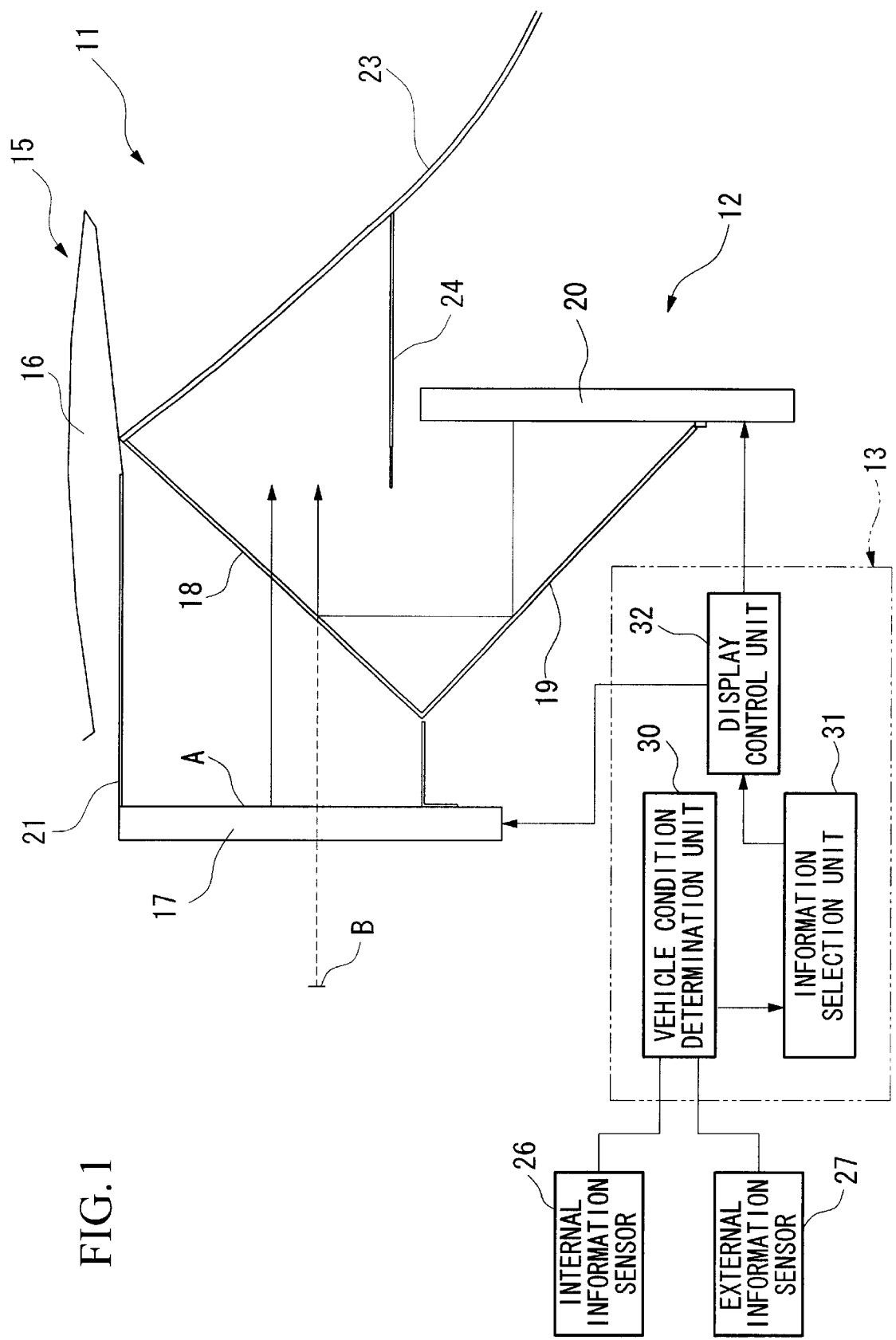
FIG. 1 is a diagram showing a cross-sectional view of the entire configuration of a display device for a vehicle according to an embodiment of the invention including a part thereof indicated by blocks.

The display device 11 for vehicles according to the embodiment, as shown in FIG. 1, includes a display unit 12, and a central processing unit (CPU) 13 which controls the display content of the display unit 12. The display unit 12 is capable of displaying three dimensional images by displaying real images and virtual images so as to be shifted in positions in a front and back direction. That is, more specifically, the display unit 12 displays three dimensional images by displaying virtual images at back and real images in front. Note that in this case a vehicle which is provided with the display device 11 is an electronic controlled vehicle controlled by the CPU 13.

First, the display unit 12, which is provided with an instrument panel 15 of the vehicle so as to oppose the driver, will be described in detail. The display unit 12 includes a first display 17 disposed at the under-back-side of a visor 16, which forms an upper surface of the instrument panel 15 and extends towards the drivers side (i.e., the right hand side in FIG. 1), so as to oppose the driver. The first display 17 displays real images for the driver and is comprised of a liquid crystal display.

Also, the display unit 12 includes a half mirror 18, a total reflection mirror 19, a second display 20, and a casing 21. The half mirror 18 is diagonally disposed below the visor 16 at the driver's side of the first display 17 so that the upper portion thereof is located at the driver's side. The total reflection mirror 19 is diagonally disposed below the half mirror 18 so as to be orthogonal to the half mirror 18. The second display 20 is disposed at the driver's side with respect to the total reflection mirror 19 and is comprised of a liquid display which displays virtual images on the half mirror 18 by projecting images onto the total reflection mirror 19. The casing 21 is provided so as to surround the space between the first display 17 and the half mirror 18.

In the display unit 12 for vehicles of this embodiment, the distance connecting the second display 20 for displaying virtual images, the total reflection mirror 19, and the half mirror 18 is set so as to be longer than the distance between the half mirror 18 and the first display 17. As a result, a virtual image B, as shown in FIG. 1, is displayed at a position far from the position of a real image A, which is displayed on the first display 17, in the depth direction so that a three dimensional (i.e., a stereoscopic) image can be displayed by the real image A and the virtual image B.

Also, the display unit 12 includes a transparent cover 23 which is diagonally disposed below the visor 16 at the driver's side of the half mirror 18 so that the height thereof decreases as approaching to the driver's side. Moreover, a blind cover 24, which covers the second display 20 and the total reflection mirror 19 and prevents incident light from the sun from projecting onto the total reflection mirror 19, is disposed above the second display 20. In this embodiment, the transparent cover 23 is made of a resin, such as an acrylic resin, and a nonreflective coating, an external light reflection coating, etc., is applied thereon.

Next, the CPU 13 will be described in detail with reference to the drawings.

As shown in FIG. 1, an internal information sensor 26 and an external information sensor 27 are connected to the CPU 13.

The internal information sensor 26 includes, for instance, a speed sensor for detecting a vehicle's speed (an internal information data) based on the rotation of a power transmission system for driving the wheels and so forth. The internal information sensor 26 is used to detect important functional information for running the vehicle, and may include, besides the speed sensor, a sensor for detecting remaining energy information (an internal information data), a sensor for detecting the rotation number information of an engine (an internal information data), a sensor for detecting the state information of a transmission (an internal information data), a sensor for detecting the state information of an electric motor (an internal information data) if the vehicle is a hybrid vehicle, and a sensor for detecting the operational state information of various internal parts (an internal information data). Also, the internal information sensor 26 includes a switch unit for detecting operational information which is obtained from the operation by the driver (an internal information data).

The external information sensor 27 includes, for instance, a CCD camera and an infrared camera for detecting vehicle-front information (an external information data), such as information on vehicles running in front, and information from lanes provided on the road (an external information data), a radar sensor for detecting information on the distance between a vehicle running in front (an external information data), a ground wave receiving device which receives ground waves externally emitted (an external information data), and a GPS receiving device which receives radio waves from a GPS satellite (an external information data). Here, examples of the ground waves received by the ground wave receiving device include, for instance, a signal transmitted from an ETS toll station (a non-stop automated toll collection system), a telephone call, and an electronic mail.

In this embodiment, the CCD camera, the infrared camera, and the radar sensor of the external information sensor 27 form a part of a driver support system. The driver support system recognizes lanes on the road by image processing the image data from the CCD camera or the infrared camera of the external information sensor 27, and calculates an optimal steering torque for going to a targeting point based on the difference between the target point, which is set on the center of the lane used as a target route, and an estimated reaching position of the vehicle. The driver support system performs the current control of the electric power steering based on the calculated optimal steering torque, and assists the driver or the vehicle in keeping in the lane.

Also, the driver support system detects the distance between the car in front based on radar sensor signals from the external information sensor 27, and reduces the vehicle's speed when the following distance decreases so that a proper distance can be maintained between the car in front. Note that the driver support system, when the speed of the car in front is high and the following distance increases, carries out a normal autocruise control so that the vehicle may run at a predetermined constant speed.

The GPS receiving device of the external information sensor 27 forms a part of the navigation system, and the navigation system determines the position of the vehicle based on data detected by the GPS receiving device of the external information sensor 27.

Also, the ground wave receiving device receives a ground wave transmitted from, for instance, an ETS toll station, and detects that the vehicle is approaching to the ETS toll station based on the received ground wave.

The CPU 13 of the display device 11 includes a vehicle condition determination unit 30, an information selection unit 31, and a display control unit 32.

The vehicle condition determination unit 30 determines the condition of the vehicle based on the internal information data from the internal information sensor 26 and the external information data from the external information sensor 27.

The information selection unit 31 selects information data to be displayed from the internal information data and the external information data based on the condition of the vehicle determined by the vehicle condition determination unit 30.

The display control unit 32, among the information data selected by the information selection unit 31, displays internal information data on the first display 17 using real images, and external information data on the second display 20 so that virtual images are displayed on the half mirror 18 via the total reflection mirror 19.

Here, the display control unit 32 controls so that the display position of the internal information data is shifted with respect to the display position of the external information data when the information data selected by the above information selection unit 31 contains only the internal information data and the data is displayed on the display unit 12 by real images and this state is switched to a state containing external information data in addition to the internal information data.

Next, examples of the display content displayed by the display unit 12 controlled by the display control unit 32 having the above-mentioned configuration will be described in detail with reference to FIGS. 2 through 12. Note that in FIGS. 2 through 12, each diagram indicated by "A" shows the image displayed on the first display 17 viewed from the driver's side (i.e., a real image), each diagram indicated by "B" shows the image displayed by the second display 20 on the half mirror 18 via the total reflection mirror 19 viewed from the driver's side (i.e., a virtual image), and each diagram indicated by "C" shows the image the driver actually sees, which is formed by displaying the images shown in diagrams "A" and "B" at the same time.

Figure 2A:
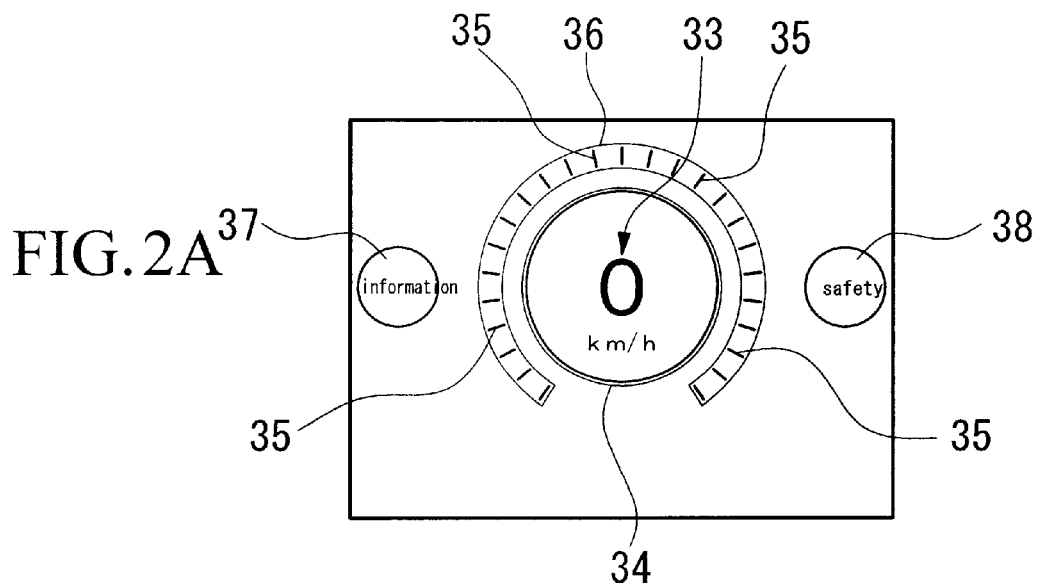
FIGS. 2A through 2C are diagrams showing a front elevational view of images displayed on a display unit of the display device for a vehicle according to an embodiment of the invention when the engine of the vehicle is started: 2A shows a real image, 2B shows a virtual image, and 2C shows an actual image displayed by superimposing the real image and the virtual image.
Figure 2B:
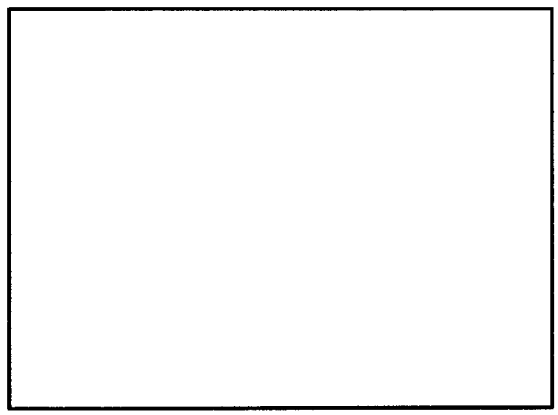
Figure 2C:
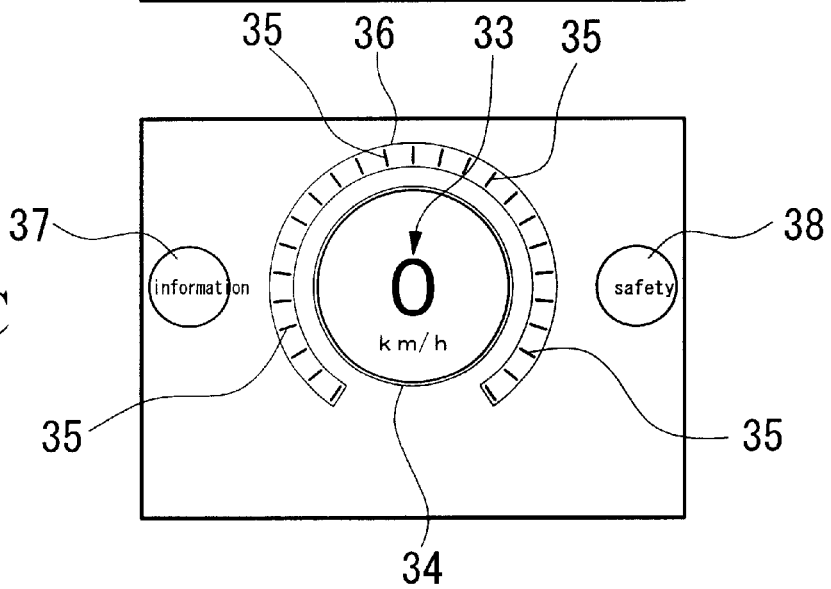

When the vehicle condition determination unit 30 determines that the engine is started (for instance, during the time between the time the ignition key is tuned on and the time the engine is actuated), an image of information data, which is selected by the information selection unit 31 and the display thereof is controlled by the display control unit 32, is displayed as shown in FIGS. 2A through 2C.

That is, as shown in FIG. 2A, a numerical information 33 on the vehicle speed information (in this case 0 km/h), which is an internal information data from a vehicle speed sensor of the internal information sensor 26, is displayed on a main display area 34 of circular shape provided at the center using a real image, and the scale 35 indicating the vehicle speed level is displayed around the main display area 34 also using a real image. Moreover, graphic information 36 on the vehicle speed information is displayed to the maximum position of the scale 35 using a real image. In addition, for instance, operational state information 37 from a sensor detecting the operational state information on various internal devices of the internal information sensor 26, and safety operation information 38 relating to the safety in operation from a switching unit of the internal information sensor 26, are displayed by the first display 17 using real images on the right and left sides of the main display area 34, respectively.

At that time, as shown in FIG. 2B, nothing is displayed by the second display 20 using virtual images.

In this manner, as shown in FIG. 2C, only the real images are displayed for the driver.

Figure 3A:
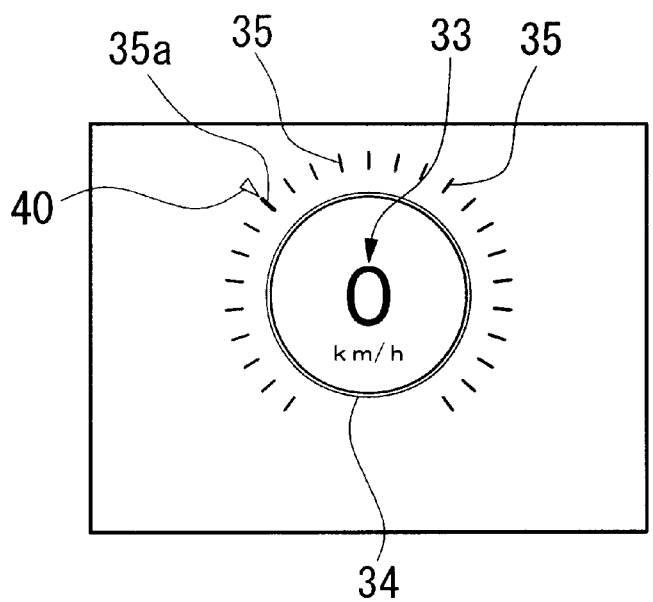
FIGS. 3A through 3C are diagrams showing a front elevational view of images displayed on a display unit of the display device for a vehicle according to an embodiment of the invention when the engine of the vehicle is started and the vehicle is stopping: 3A shows a real image, 3B shows a virtual image, and 3C shows an actual image displayed by superimposing the real image and the virtual image.
Figure 3B:
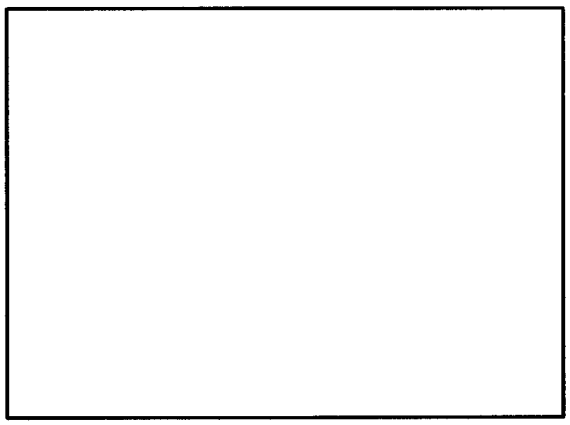
Figure 3C:
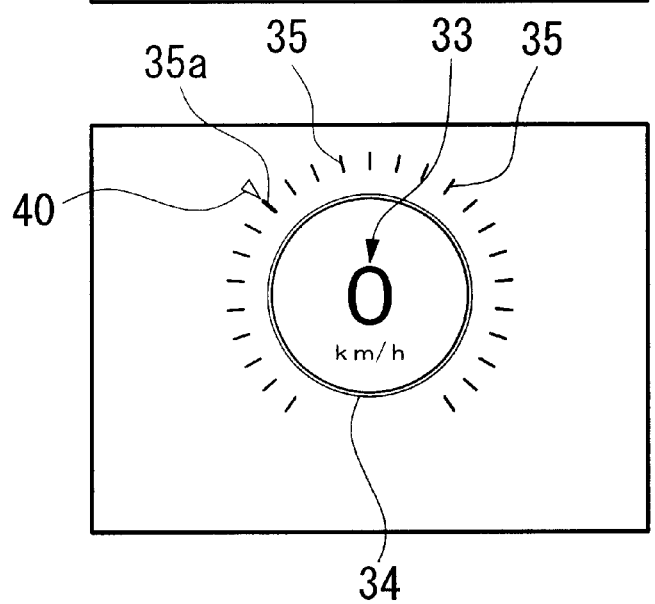

When the vehicle condition determination unit 30 determines that the engine is started and the vehicle is stopping, an image of information data, which is selected by the information selection unit 31 and the display thereof is controlled by the display control unit 32, is displayed as shown in FIGS. 3A through 3C.

That is, as shown in FIG. 3A, the numerical information 33 on the vehicle speed information, which is an internal information data, is displayed on the main display area 34 of circular shape provided at the center using a real image, and the scale 35 indicating the vehicle speed level is displayed around the main display area 34 also using a real image. Moreover, the color of a part 35a of the scale 35, which indicates the legal speed limit of the vehicle, is changed to a different color as compared with the rest of the scale 35 using a real image, and an arrow 40 is displayed outside the part 35a using a real image.

At that time, as shown in FIG. 3B, nothing is displayed by the second display 20 using virtual images.

In this manner, as shown in FIG. 3C, only the real images are displayed for the driver.

Figure 4A:
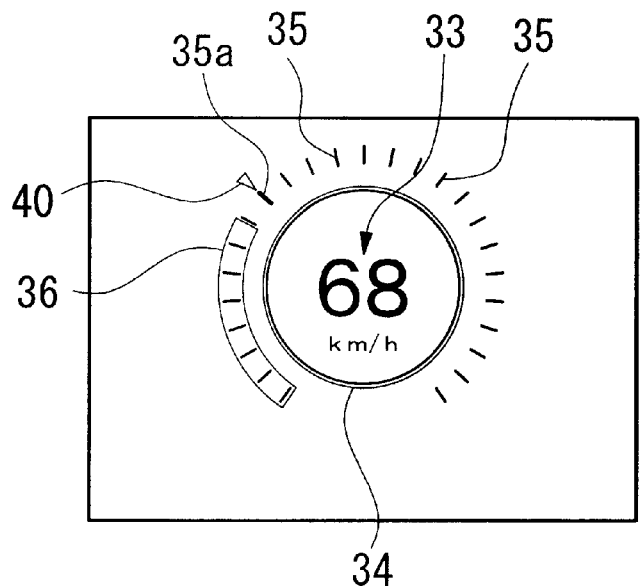
FIGS. 4A through 4C are diagrams showing a front elevational view of images displayed on a display unit of the display device for a vehicle according to an embodiment of the invention when the vehicle is travelling in a normal running mode: 4A shows a real image, 4B shows a virtual image, and 4C shows an actual image displayed by superimposing the real image and the virtual image.
Figure 4B:
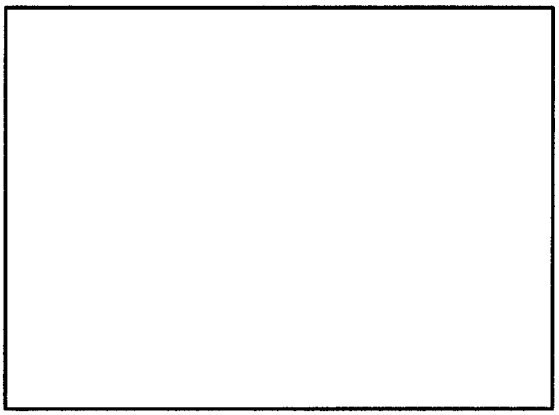
Figure 4C:
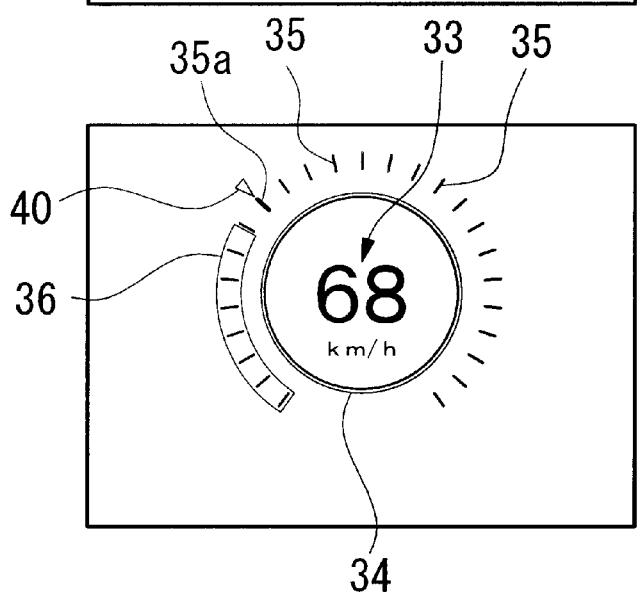

When the vehicle condition determination unit 30 determines that the vehicle is travelling in a normal running mode, an image of information data, which is selected by the information selection unit 31 and the display thereof is controlled by the display control unit 32, is displayed as shown in FIGS. 4A through 4C.

That is, as shown in FIG. 4A, as in the case shown in FIG. 3 where the engine is started and the vehicle is stopping, the numerical information 33 on the vehicle speed information, which is an internal information data, is displayed on the main display area 34 of circular shape provided at the center using a real image, and the scale 35 indicating the vehicle speed level is displayed around the main display area 34 also using a real image. Moreover, the color of a part 35a of the scale 35, which indicates the legal speed limit of the vehicle, is displayed using a different color as compared with the rest of the scale 35 using a real image, and the arrow 40 is displayed outside the part 35a using a real image. In addition, the graphic information 36 on the vehicle speed information, which is an internal information data from the vehicle speed sensor of the internal information sensor 26, is displayed to the position of a corresponding part of the scale 35 by the first display 17 using a real image.

At that time, as shown in FIG. 4B, nothing is displayed by the second display 20 using virtual images.

In this manner, as shown in FIG. 4C, only the real images are displayed for the driver.

Figure 5A:
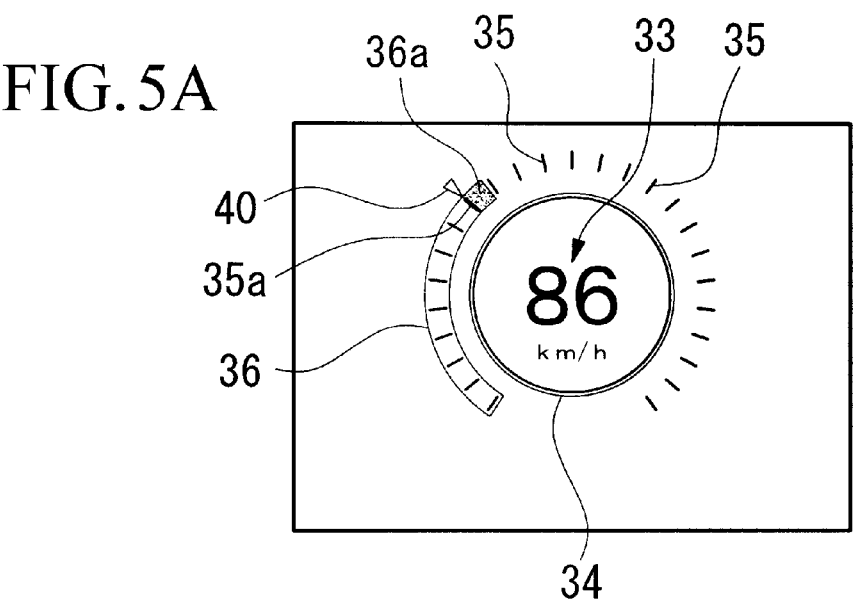
FIGS. 5A through 5C are diagrams showing a front elevational view of images displayed on a display unit of the display device for a vehicle according to an embodiment of the invention when the vehicle is travelling exceeding the legal speed limit of the vehicle: 5A shows a real image, 5B shows a virtual image, and 5C shows an actual image displayed by superimposing the real image and the virtual image.
Figure 5B:
Figure 5C:
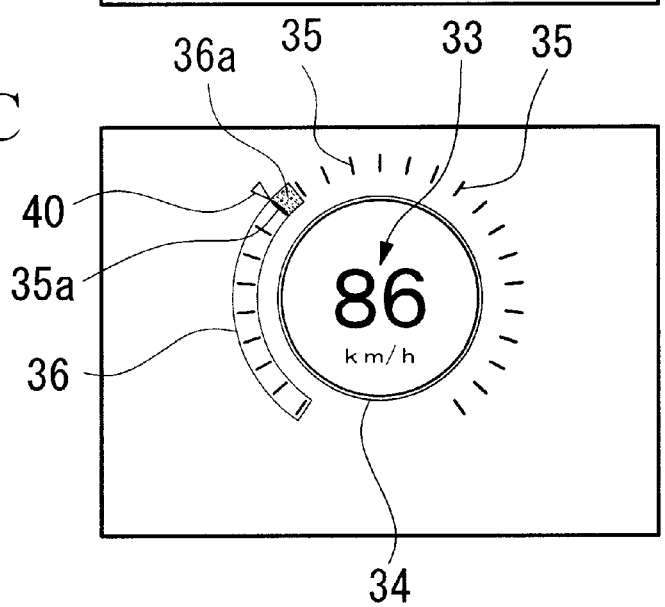

When the vehicle condition determination unit 30 determines that the vehicle is traveling exceeding the legal speed limit, an image of information data, which is selected by the information selection unit 31 and the display thereof is controlled by the display control unit 32, is displayed as shown in FIGS. 5A through 5C.

That is, as shown in FIG. 5A, as when the vehicle is travelling in a normal running mode, the numerical information 33 on the vehicle speed information, which is an internal information data, is displayed on the main display area 34 of circular shape provided at the center by the first display 17 using a real image, and the scale 35 indicating the vehicle speed level is displayed around the main display area 34 also using a real image. Moreover, the color of the part 35a of the scale 35, which indicates the legal speed limit of the vehicle, is displayed using a different color as compared with the rest of the scale 35 by the first display 17 using a real image, and the arrow 40 is displayed outside the part 35a using a real image. In addition, the graphic information 36 on the vehicle speed information, which is an internal information data, is displayed to the position of a corresponding part of the scale 35 by the first display 17 using a real image. In this manner, as compared with the image displayed during the normal running mode, a portion of the graphic information 36 exceeds the part 35a which indicates the legal speed limit. A portion 36a of the graphic information 36 which exceeds the legal speed limit is displayed in a color different from the rest of the graphic information 36 below the legal speed limit.

At that time, as shown in FIG. 5B, nothing is displayed by the second display 20 using virtual images.

In this manner, as shown in FIG. 5C, only the real images are displayed for the driver.

Figure 6A:
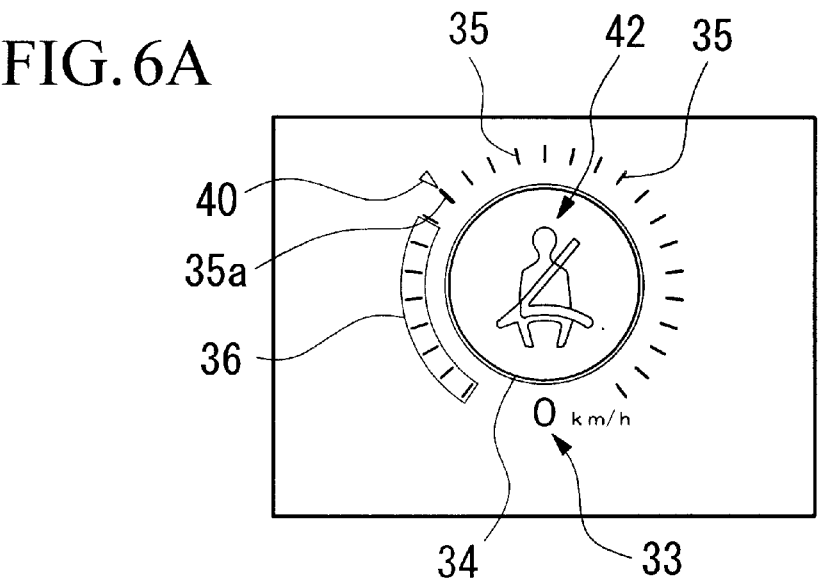
FIGS. 6A through 6C are diagrams showing a front elevational view of images displayed on a display unit of the display device for a vehicle according to an embodiment of the invention when the engine of the vehicle is started, the vehicle is stopping, and the seat belt is not worn: 6A shows a real image, 6B shows a virtual image, and 6C shows an actual image displayed by superimposing the real image and the virtual image.
Figure 6B:
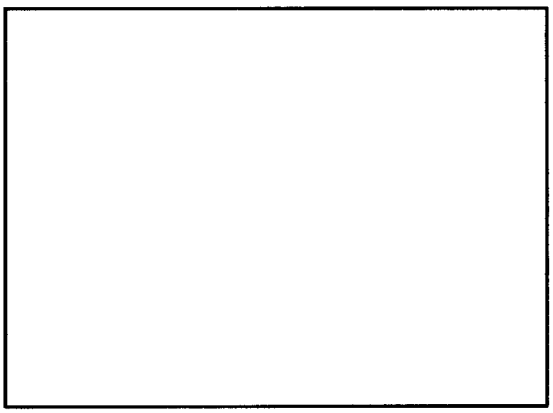
Figure 6C:
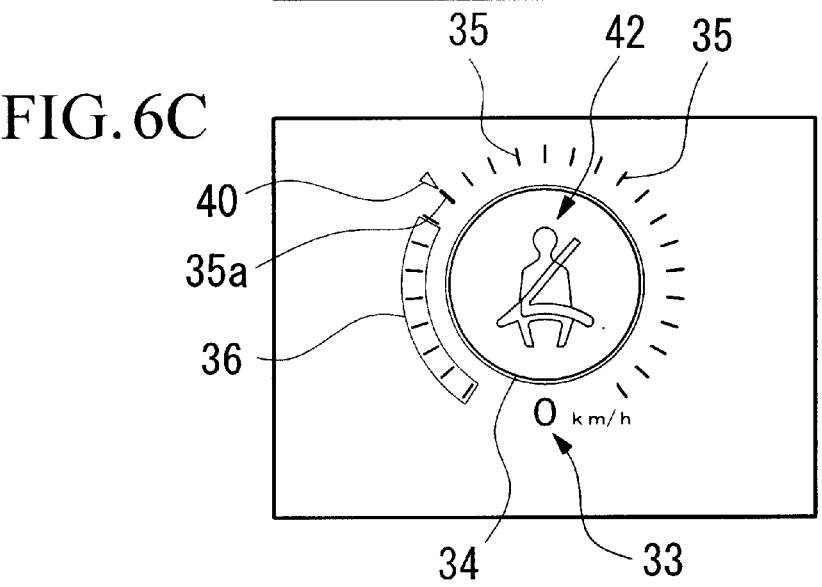

When the vehicle condition determination unit 30 determines that the engine is started and the vehicle is stopping, and that the seat belt is not used, an image of information data, which is selected by the information selection unit 31 and the display thereof is controlled by the display control unit 32, is displayed as shown in FIGS. 6A through 6C.

That is, as shown in FIG. 6A, when information indicating that the seat belt is not worn is detected from the operational information, which is an internal information data supplied from the switch unit of the internal information sensor 26, a seat belt non-wearing information 42 is displayed on the main display area 34 of circular shape provided at the center by the first display 17 using a real image, and the scale 35 indicating the vehicle speed level is displayed around the main display area 34 also using a real image. In addition, the color of the part 35a of the scale 35, which indicates the legal speed limit of the vehicle, is displayed using a different color as compared with the rest of the scale 35 by the first display 17 using a real image, and the arrow 40 is displayed outside the part 35a using a real image. Note that the numerical information 33 on the vehicle speed information, which is an internal information data from the vehicle speed sensor of the internal information sensor 26, is displayed below the main display area 34 on which the seat belt non-wearing information 42 is displayed, by the first display 17 using a real image.

At that time, as shown in FIG. 6B, nothing is displayed by the second display 20 using virtual images.

In this manner, as shown in FIG. 6C, only the real images are displayed for the driver.

Figure 7A:
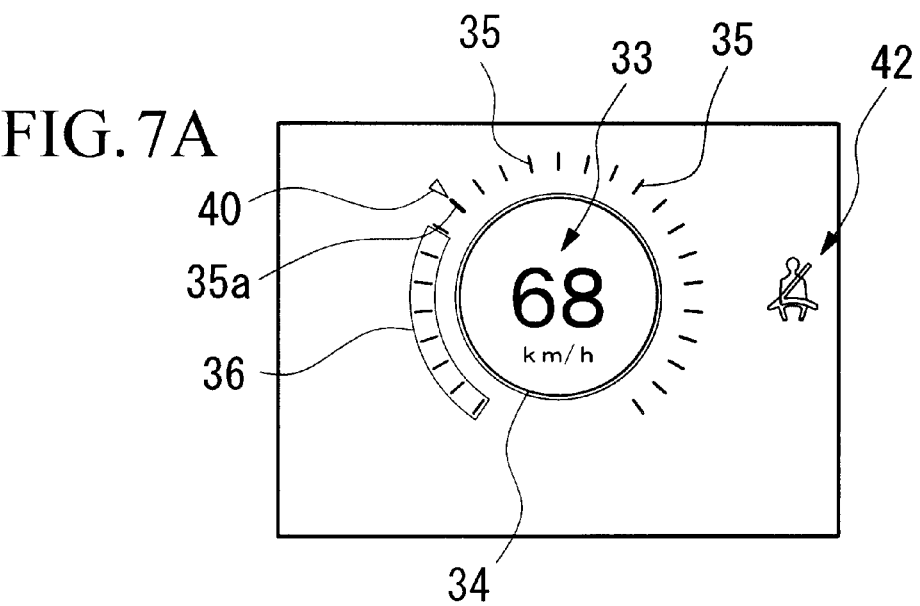
FIGS. 7A through 7C are diagrams showing a front elevational view of images displayed on a display unit of the display device for a vehicle according to an embodiment of the invention when the vehicle is travelling in a normal running mode or exceeding the legal speed limit of the vehicle, and the seat belt is not worn: 7A shows a real image, 7B shows a virtual image, and 7C shows an actual image displayed by superimposing the real image and the virtual image.
Figure 7B:
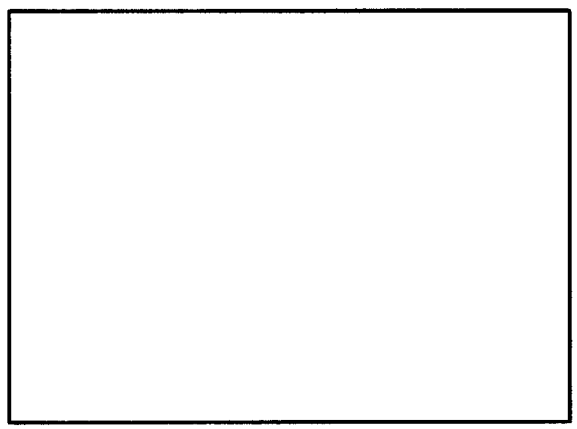
Figure 7C:
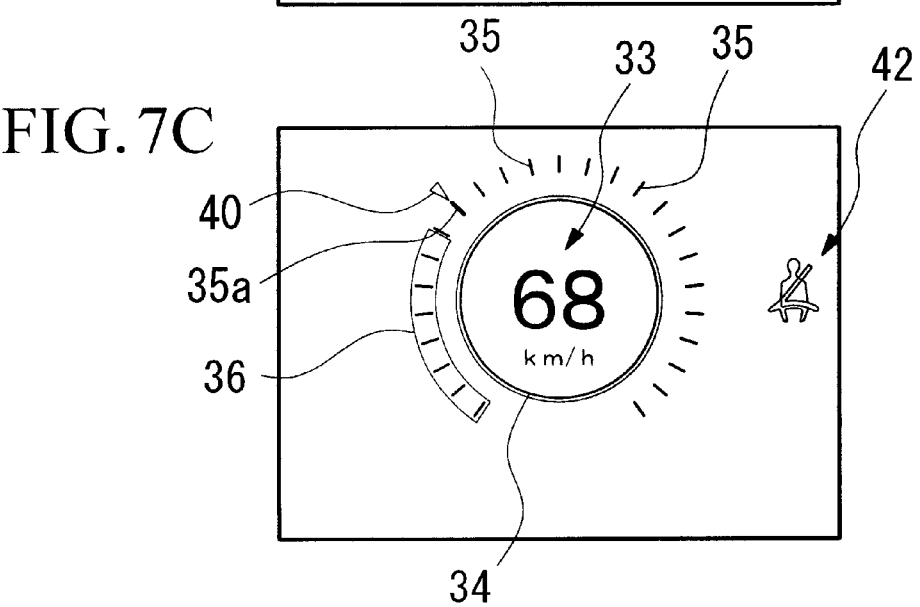

When the vehicle condition determination unit 30 determines that the vehicle is travelling in a normal running mode or exceeding the legal speed limit, and that the seat belt is not used, an image of information data, which is selected by the information selection unit 31 and the display thereof is controlled by the display control unit 32, is displayed as shown in FIGS. 7A through 7C.

That is, as shown in FIG. 7A, the numerical information 33 on the vehicle speed information, which is an internal information data, is displayed on the main display area 34 of circular shape provided at the center by the first display 17 using a real image, and the scale 35 indicating the vehicle speed level is displayed around the main display area 34 also using a real image. Also, the color of the part 35a of the scale 35, which indicates the legal speed limit of the vehicle, is displayed using a different color as compared with the rest of the scale 35 by the first display 17 using a real image, and the arrow 40 is displayed outside the part 35a using a real image. Moreover, the graphic information 36 on the vehicle speed information, which is an internal information data, is displayed to the position of a corresponding part of the scale 35 by the first display 17 using a real image. Further, since information indicating that the seat belt is not worn is detected from the operational information, which is an internal information data from the switch unit of the internal information sensor 26, a seat belt non-wearing information 42 based on the internal information data is displayed, for instance, on right hand side of the main display area 34 displaying the numerical information 33, by the first display 17 using a real image.

At that time, as shown in FIG. 7B, nothing is displayed by the second display 20 using virtual images.

In this manner, as shown in FIG. 7C, only the real images are displayed for the driver.

Figure 8A:
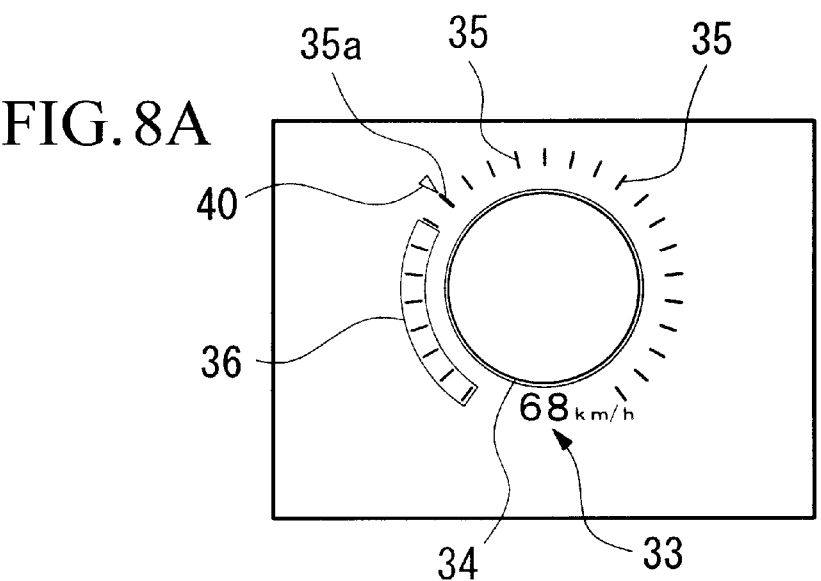
FIGS. 8A through 8C are diagrams showing a front elevational view of images displayed on a display unit of the display device for a vehicle according to an embodiment of the invention when the vehicle is travelling in a normal running mode or exceeding the legal speed limit of the vehicle, and the vehicle is approaching to an ETC toll station: 8A shows a real image, 8B shows a virtual image, and 8C shows an actual image displayed by superimposing the real image and the virtual image.
Figure 8B:
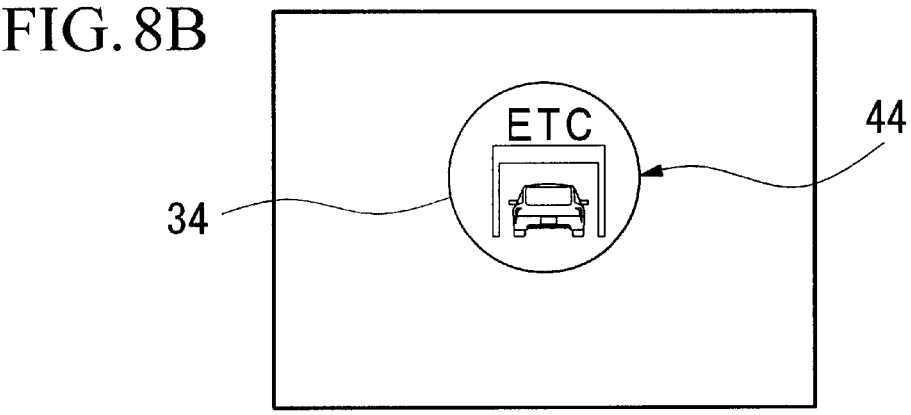
Figure 8C:
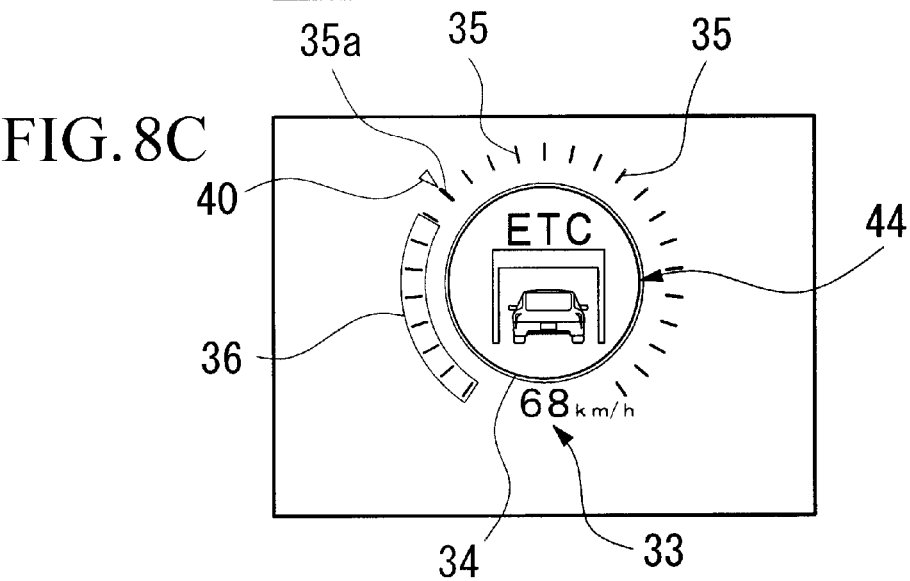

When the vehicle condition determination unit 30 determines that the vehicle is travelling in a normal running mode or exceeding the legal speed limit, and approaching to an ETC toll station, an image of information data, which is selected by the information selection unit 31 and the display thereof is controlled by the display control unit 32, is displayed as shown in FIGS. 8A through 8C.

That is, as shown in FIG. 8A, nothing is displayed on the main display area 34 of circular shape provided at the center by the first display 17, and only the scale 35 indicating the vehicle speed level is displayed around the main display area 34 using a real image. Also, the color of the part 35a of the scale 35, which indicates the legal speed limit of the vehicle, is displayed using a different color as compared with the rest of the scale 35 by the first display 17 using a real image, and the arrow 40 is displayed outside the part 35a using a real image. Moreover, the graphic information 36 on the vehicle speed information, which is an internal information data, is displayed to the position of a corresponding part of the scale 35 by the first display 17 using a real image. Further, the numerical information 33 on the vehicle speed information, which is an internal information data, is displayed below the main display area 34 by the first display 17 using a real image.

At that time, for instance, a ground wave from an ETC toll station, which is an external information data, is received by the ground wave receiving device of the external information sensor 27, and as shown in FIG. 8B, an ETC information 44, which is an external information data based on the received ground wave, indicating that the vehicle is approaching to the ETC toll station, is displayed on the main display area 34 using a virtual image. Here, the ETC information 44 is displayed by using a schematic diagram showing an ETC gate viewed from the driver's seat.

In this manner, as shown in FIG. 8C, when viewed from the driver's side, the ETC information 44 indicating that the vehicle is approaching to the ETC toll station is displayed on the main display area 34 using a virtual image, and the numerical information 33 on the vehicle speed information is displayed in front of the virtual image on the main display area 34 using a real image.

Accordingly, only the internal information data, i.e., the real image displayed by the first display 17, is displayed on the main display area 34 when the vehicle in the running mode is not in the vicinity of the ETC. When the vehicle approaches to the ETC toll station, on the other hand, the external information data in addition to the internal information data is displayed on the main display area 34, and at that time, it is controlled so that the numerical information 33 on the vehicle speed, which is the internal information data, is displayed at a position shifted from the display position of the ETC information 44, which is the external information data.

Figure 9A:
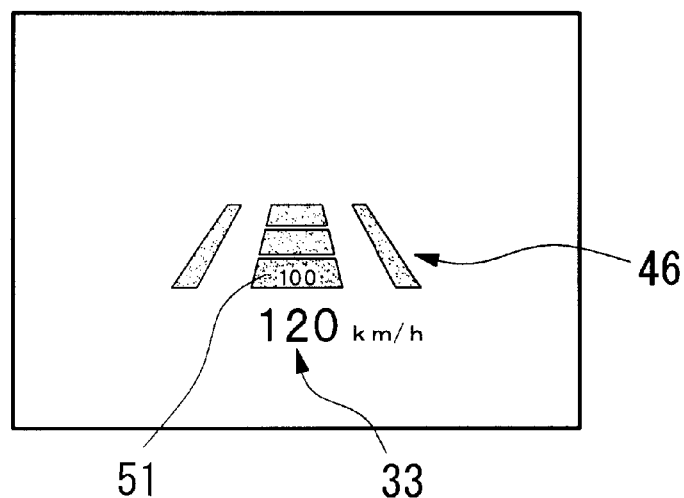
FIGS. 9A through 9C are diagrams showing a front elevational view of images displayed on a display unit of the display device for a vehicle according to an embodiment of the invention when a driver support system is actuated: 9A shows a real image, 9B shows a virtual image, and 9C shows an actual image displayed by superimposing the real image and the virtual image.
Figure 9B:
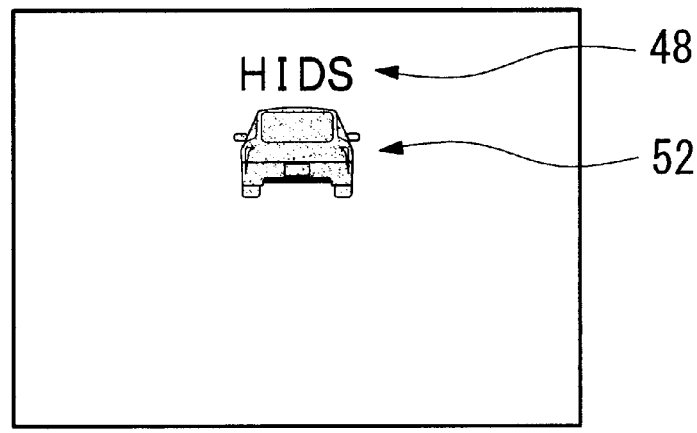
Figure 9C:
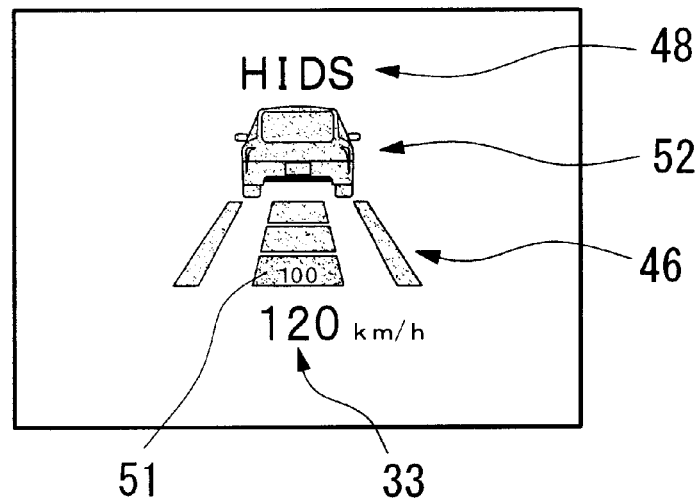

When the vehicle condition determination unit 30 determines that the driver assist system is operated, an image of information data, which is selected by the information selection unit 31 and the display thereof is controlled by the display control unit 32, is displayed as shown in FIGS. 9A through 9C.

That is, as shown in FIG. 9A, a lane keep information 46 which indicates that the vehicle is keeping in a certain lane is displayed by the first display 17 using a real image, and the numerical information 33 on the vehicle speed information, which is an internal information data, is displayed below the main display area 34 by the first display 17 using a real image. Also, a numerical information 51 on the legal speed limit of the vehicle is displayed at the center of the lane keep information 46 using the real image. Here, the lane keep information 46 is displayed using a schematic diagram showing a lane viewed from the driver's seat.

At that time, as shown in FIG. 9B, operation display characters 48, which indicate the actuation of the driver support system, are displayed by the second display 20 using a virtual image, and a car clearance information 52, which is an external information data, indicating that there is a certain distance between the car in front, is also displayed. Here, the car clearance information 52 is displayed using a colored schematic diagram showing the back of a car viewed from the driver's seat.

In this manner, as shown in FIG. 9C, the lane keep information 46 indicating that the vehicle is keeping in the lane is displayed by the first display 17 using a real image, and the numerical information 33 on the vehicle speed information, which is an internal information data, is displayed below the lane keep information 46 using a real image. Also, the numerical information 51 indicating the legal speed limit of the vehicle is displayed at the center of the lane keep information 46 using the real image. Moreover, the operation display characters 48, which indicate the actuation of the driver support system, and the car clearance information 52, which indicates that there is a certain distance between the car in front, are displayed above the lane keep information 46 using virtual images to be stereoscopically viewed at the back of the real image.

Figure 10A:
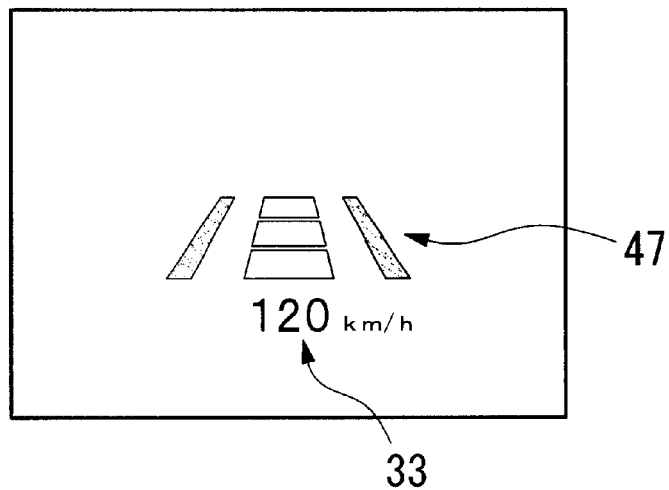
FIGS. 10A through 10C are diagrams showing a front elevational view of images displayed on a display unit of the display device for a vehicle according to an embodiment of the invention when the driver support system is actuated and a lane keeping operation for the vehicle is carried out: 10A shows a real image, 10B shows a virtual image, and 10C shows an actual image displayed by superimposing the real image and the virtual image.
Figure 10B:
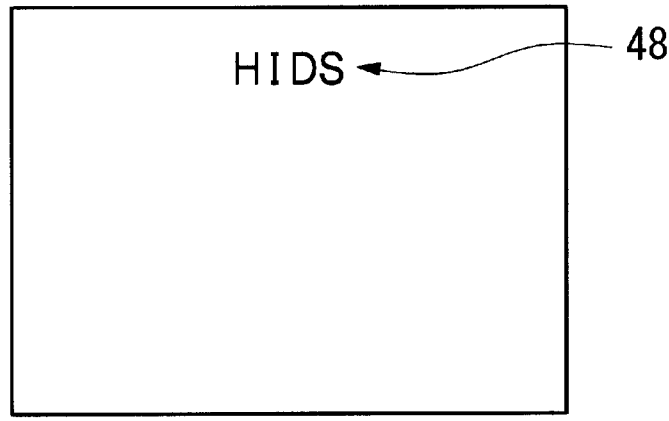
Figure 10C:
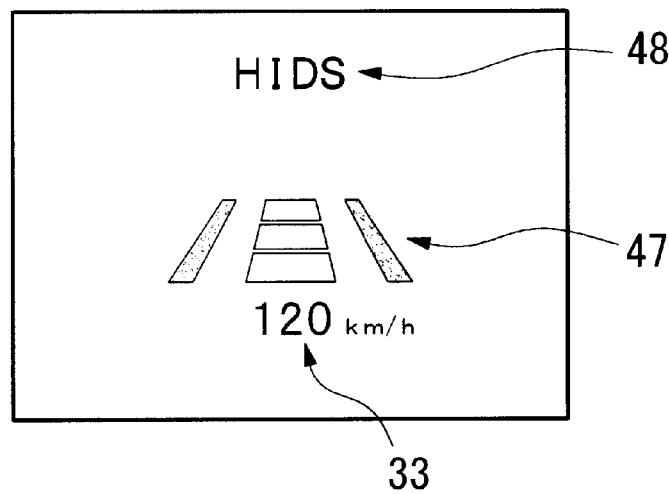

When the vehicle condition determination unit 30 determines that the driver assist system is operated and only the lane keep operation is carried out, an image of information data, which is selected by the information selection unit 31 and the display thereof is controlled by the display control unit 32, is displayed as shown in FIGS. 10A through 10C.

That is, as shown in FIG. 10A, a lane keep information 47 which indicates that the vehicle is keeping in a certain lane is displayed by the first display 17 using a real image, and the numerical information 33 on the vehicle speed information, which is an internal information data, is displayed below the lane keep information 47 by the first display 17 using a real image. Here, the middle portion of the lane keep information 47, as compared with that of the lane keep information 46 displayed when the driver support system is actuated, is changed to show only the contours thereof.

At that time, as shown in FIG. 10B, the operation display characters 48, which show the actuation of the driver support system, are displayed by the second display 20 using virtual images.

In this manner, as shown in FIG. 10C, the lane keep information 47 indicating that the vehicle is keeping in the lane is displayed by the first display 17 using a real image to the driver, and the numerical information 33 on the vehicle speed information, which is an internal information data, is displayed below the lane keep information 47 also using a real image. Also, the operation display characters 48, which show the actuation of the driver support system, are displayed above the lane keep information 47 using virtual images to be stereoscopically viewed at the back of the real image.

Figure 11A:
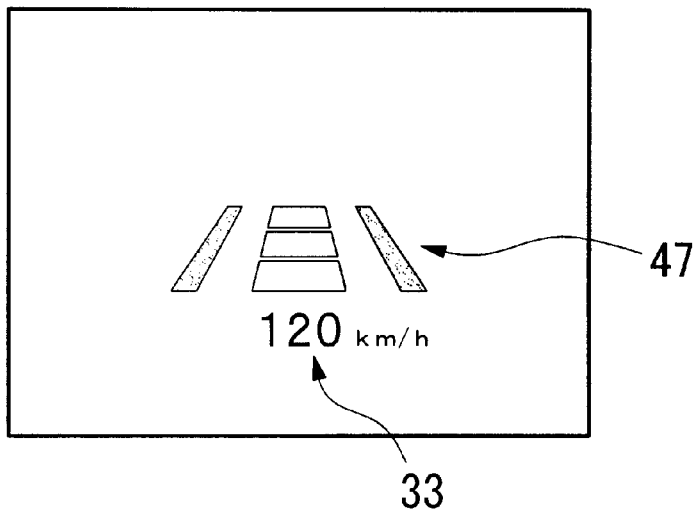
FIGS. 11A through 11C are diagrams showing a front elevational view of images displayed on a display unit of the display device for a vehicle according to an embodiment of the invention when the driver support system is actuated, and the lane keeping operation for the vehicle and a car-in-front capturing operation are carried out: 11A shows a real image, 11B shows a virtual image, and 11C shows an actual image displayed by superimposing the real image and the virtual image.
Figure 11B:
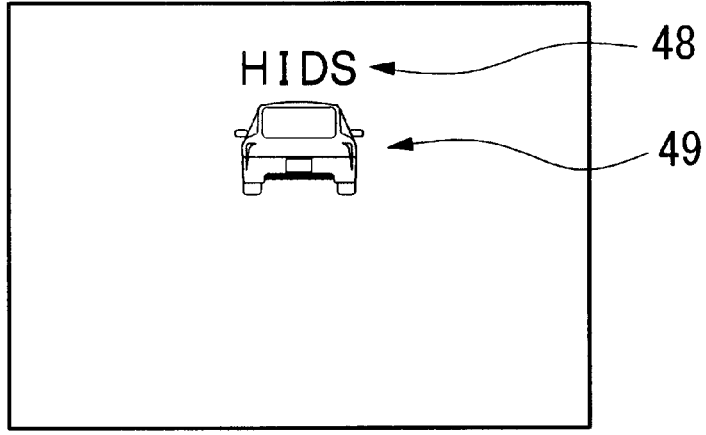
Figure 11C:
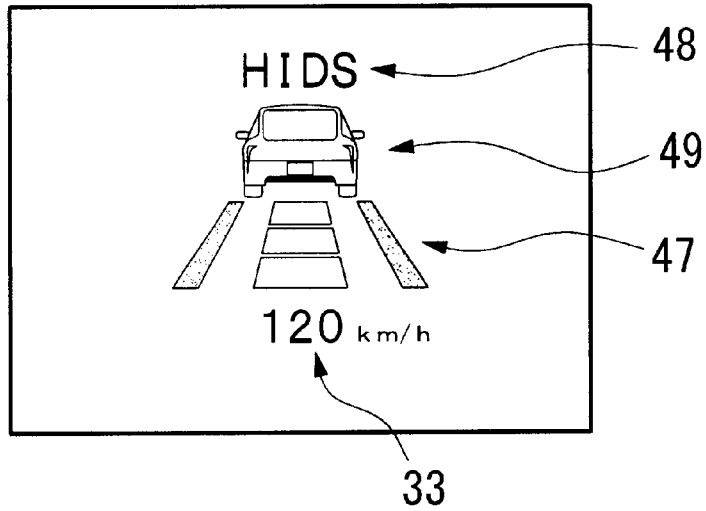

When the vehicle condition determination unit 30 determines that the driver assist system is operated and the lane keeping operation is carried out while there is a car in front, an image of information data, which is selected by the information selection unit 31 and the display thereof is controlled by the display control unit 32, is displayed as shown in FIGS. 11A through 11C.

That is, as shown in FIG. 11A, the lane keep information 47 which indicates that the vehicle is keeping in the lane is displayed by the first display 17 using a real image, and the numerical information 33 on the vehicle speed information, which is an internal information data, is displayed below the lane keep information 47 by the first display 17 using a real image.

At that time, as shown in FIG. 11B, the operation display characters 48, which show the actuation of the driver support system, are displayed by the second display 20 using virtual images. Also, since it is detected that there is a car in front based on external information data supplied from a car in front information and a distance information obtained by the CCD camera and the radar sensor of the external information sensor 27, a car-in-front captured information 49, which indicates the detection of a car in front, is displayed by the second display 20. Here, the car-in-front captured information 49 is displayed using a schematic diagram showing the back of a car viewed from the driver's seat, and only the contours of the car are shown.

In this manner, as shown in FIG. 11C, the lane keep information 47 indicating that the vehicle is keeping in the lane is displayed by the first display 17 using a real image, and the numerical information 33 on the vehicle speed information, which is an internal information data, is displayed below the lane keep information 47 using also a real image to the driver. Moreover, the operation display characters 48, which show the actuation of the driver support system, are displayed above the lane keep information 47 using virtual images to be stereoscopically viewed at the back of the real image, and the car-in-front captured information 49 based on the external information data is displayed between the lane keep information 47 and the operation display characters 48 using virtual images to be stereoscopically viewed at the back.

Figure 12A:
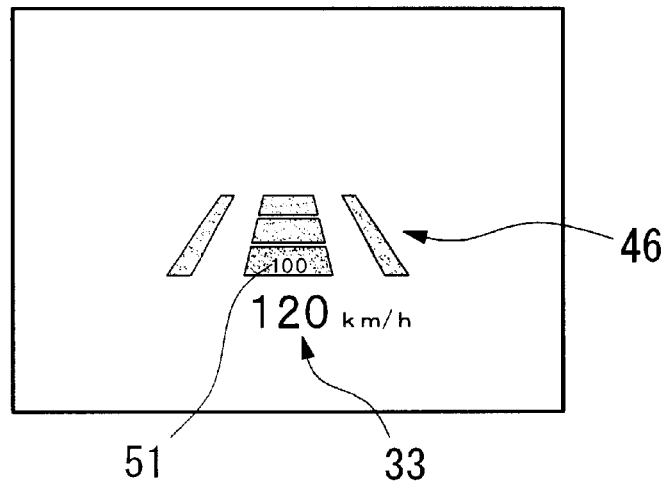
FIGS. 12A through 12C are diagrams showing a front elevational view of images displayed on a display unit of the display device for a vehicle according to an embodiment of the invention when the driver support system is actuated, the lane keeping operation for the vehicle is carried out, and the vehicle is switched to an autocruise control since the speed of a car running in front is increased: 12A shows a real image, 12B shows a virtual image, and 12C shows an actual image displayed by superimposing the real image and the virtual image.
Figure 12B:
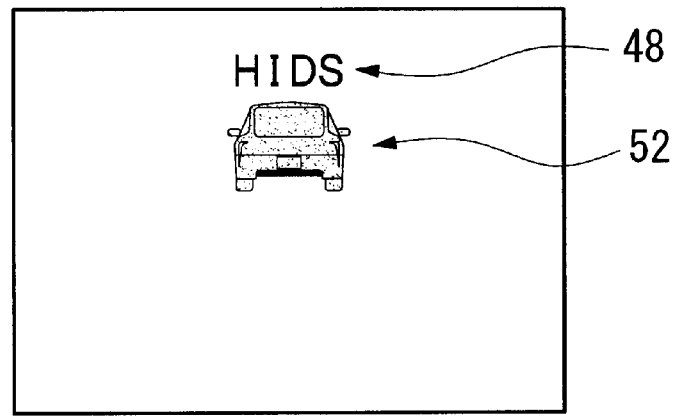
Figure 12C:
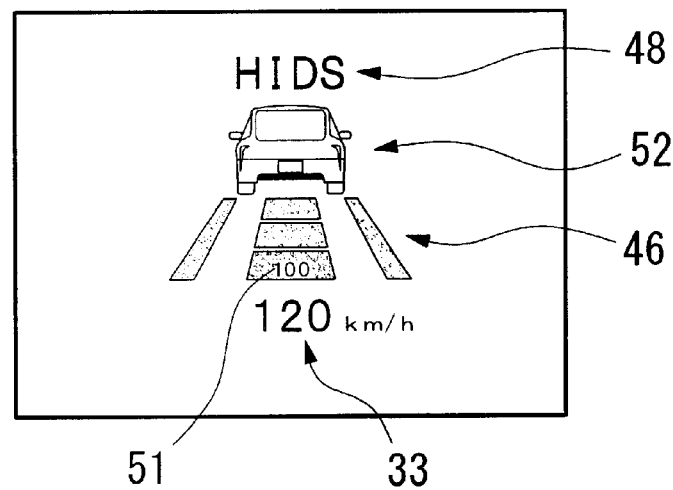

When the vehicle condition determination unit 30 determines that the driver assist system is being operated, the lane keep operation is being carried out, and the vehicle is switched to an autocruise control since the speed of the car in front is increased, an image of information data, which is selected by the information selection unit 31 and the display thereof is controlled by the display control unit 32, is displayed as shown in FIGS. 12A through 12C.

That is, as shown in FIG. 12A, the lane keep information 46 which indicates that the vehicle is keeping in the lane is displayed by the first display 17 using a real image, and the numerical information 33 on the vehicle speed information, which is an internal information data, is displayed below the lane keep information 46 by the first display 17 using a real image. Also, the numerical information 51 indicating the legal speed limit of the vehicle is displayed at the center of the lane keep information 46 using the real image.

At that time, as shown in FIG. 12B, the operation display characters 48, which show the actuation of the driver support system, are displayed by the second display 20 using virtual images. Also, since it is detected that the captured car running in front is separating away from the vehicle based on an external information data supplied from a car in front information and a distance information obtained by the CCD camera and the radar sensor of the external information sensor 27, a car-in-front separation information 52, which indicates the detection of separation of the captured car in front, is displayed by the second display 20. Note that the car-in-front separation information 52 can be displayed, when the distance between the car in front, which is an external information data, is detected from the radar sensor of the external information sensor 27, by using moving images which show the size of the car smaller as the distance between the car in front increases so that the driver recognizes that the car in front is separating away from the vehicle the driver is driving.

In this manner, as shown in FIG. 12C, the lane keep information 46 indicating that the vehicle is keeping in the lane is displayed by the first display 17 using a real image to the driver, and the numerical information 51 on the legal speed limit of the vehicle is displayed between the lane keep information 46 also using a real image. Moreover, the numerical information 33 on the vehicle speed information, which is an internal information data, is displayed below the lane keep information 46 by the first display 17 using a real image. Further, the operation display characters 48, which show the actuation of the driver support system, are displayed above the lane keep information 46 using virtual images to be stereoscopically viewed at the back, and the car-in-front separation information 52 based on the external information data is displayed between the lane keep information 46 and the operation display characters 48 using virtual images to be stereoscopically viewed at the back.

According to the display device 11 for a vehicle explained above, when the vehicle condition determination unit 30 determines the condition of a vehicle based on internal information data including at least vehicle speed information and external information data including at least information relating to a car in front, the information selection unit 31, based on the condition of the vehicle determined by the vehicle condition determination unit 30, selects information data to be displayed on the display unit 12 from the internal information data and the external information data. Then, the display control unit 32, among the information data selected by the information selection unit 31, displays the internal information data, such as the numerical information 33 on the vehicle speed information, on the display unit 12 using a real image, and the external information data, such as the ETC information 44, the car-in-front captured information 49, and the car-in-front separation information 52, on the display unit 12 using a virtual image. By displaying the internal information data including at least the vehicle speed information, i.e., the information data particularly required to be read by the driver, using a real image, it becomes possible to clearly display the information, and the external information data including at least the information on a car in front, i.e., the information which may be better to be sensuously understood by the driver, is displayed using virtual images.

In this manner, not only does it become possible to clearly display the information data which is required for the driver to read or make out using real images, but also the information required for the driver to read or make out can further be clarified by displaying the information, which may be better sensuously understood by the driver, using virtual images. In addition, by displaying the information, which may be better sensuously understood by the driver, such as the operation state of the driver support system, using virtual images, it becomes possible to make the driver intuitively understand the information. Accordingly, it becomes possible to reduce the labor of the driver in reading and understanding the displayed information, and as a result, it becomes possible to reduce the fatigue of the driver caused by driving the vehicle.

Also, since the display unit 12 displays real images in front and virtual images at back, the internal information data including at least the vehicle speed information, i.e., the information data particularly required to be read or understood by the driver, is displayed stereoscopically in front using real images so that it can be more clearly displayed, and the external information data including at least the information on a car in front, i.e., the information which may be better sensuously understood by the driver, is displayed stereoscopically at the back using virtual images.

Accordingly, not only can the information data which is required for the driver to make out be clearly displayed in front using real images, but also the information required for the driver to make out can further be clarified by displaying the information, which may be better sensuously understood by the driver, using virtual images at the back. In this manner, it becomes possible to reduce the labor of the driver to read and understand the displayed information, and as a result, it becomes possible to further reduce the fatigue of the driver caused by driving the vehicle.

In addition, since the half mirror 18 is disposed at the driver side of the first display 17, and the total reflection mirror 19 and the second display 20 are disposed substantially below the half mirror 18 and the first display 17 viewed from the driver's side, the display unit 12 does not protrude towards the front glass side.

Accordingly, it becomes possible to prevent the display unit 12 from interfering with the driver's view.

Also, when a state of the display is switched from a state where only the internal information data, such as the numerical information 33 on the vehicle speed information, is displayed on the display unit 12 using a real image to a state where the ETC information 44, which is an external information data indicating that the vehicle is approaching to an ETC toll station, is displayed on the display unit 12 in addition to the internal information data, such as the numerical information 33 on the vehicle speed information, for instance, as in the case where the display state shown in FIG. 4 is switched to the display state shown in FIG. 8, the display control unit 32 controls so that the display position of the internal information data, such as the numerical information 33 on the vehicle speed information, is shifted with respect to the display position of the ETC information 44, which is an external information data. Accordingly, it becomes possible to display both the internal information data and the external information data without interfering with each other. Thus, both the internal information data and the external information data can be clearly viewed in an excellent manner.

Note that although the case where the vehicle speed information is mainly displayed on the display unit 12 is explained above with reference to FIGS. 2 through 12, it is possible to display information including important functional information for driving a vehicle, such as, besides the vehicle speed, the rotation number of the engine, and a booster state of an electric motor if the vehicle is a hybrid vehicle, using real images.

Also, although the explanation is made for the case where an ETC approaching state and an operational state of the driver support system are displayed using virtual images with reference to FIGS. 2 through 12, what is displayed by using virtual images is functional information that is important next to the above-mentioned important functional information displayed using real images. Accordingly, information, such as smart maintenance information which urges maintenance of a part requiring maintenance, may be displayed besides the ETC approaching state and the operational state of the driver support system. In such a case, it may be possible to display the parts required to be maintained using moving images by, for instance, displaying first the entire vehicle on the display unit 12 while running under the autocruise control, and indicating the parts necessary to be maintained using a flickering red lamp. Then, if a brake pad requires maintenance due to friction, the tire may be displayed in an expanded scale, and subsequently, the brake portion may be displayed in an expanded scale using moving images.

Also, although the case where the display unit 12 includes the first display 17 for displaying real images and the second display 20 for displaying virtual images, which is separated from the first display 17, is explained in the above embodiment, it is possible to use only one display which functions as both a display for displaying real images and a display for displaying virtual images. That is, in a display unit 54 shown in FIGS. 13 and 14, a display 55, such as a liquid crystal display, includes a display area 56 for displaying real images and display areas 57 and 58 for displaying virtual images, and a total reflection mirror 60 and half mirrors 61 and 62 are suitably arranged so that the display unit 54 can combine functions of both a display for real images and a display for virtual images.

Figure 13:
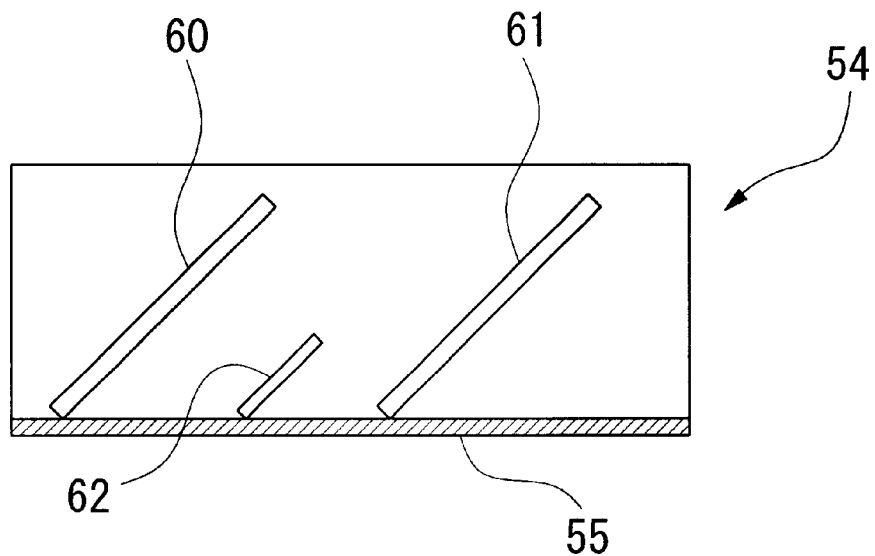
FIG. 13 is a diagram showing a cross-sectional view of a display unit of the display device for a vehicle according to a modified embodiment of the invention.
Figure 14:
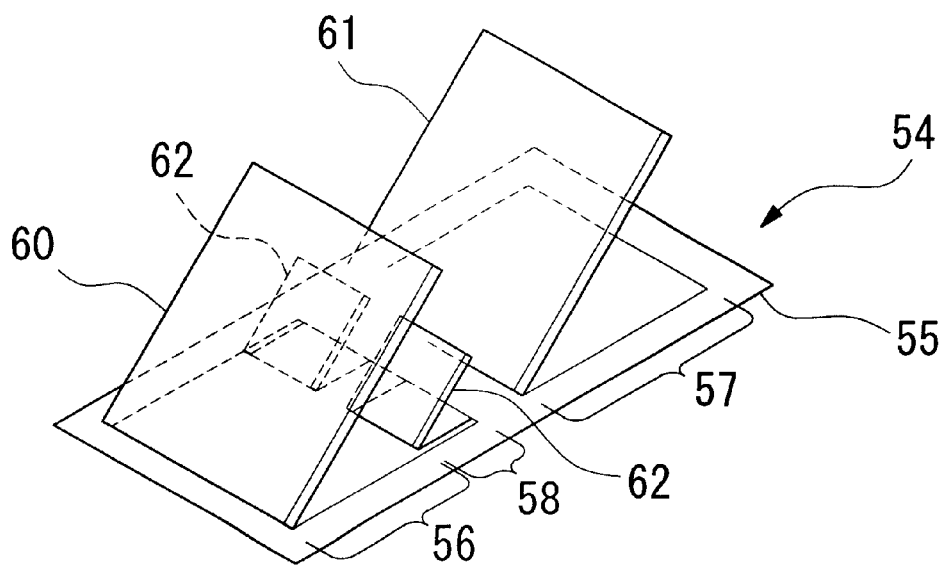
FIG. 14 is a diagram showing a perspective view of the display unit of the display device for a vehicle according to the embodiment of the invention.

In the display unit 54 shown in FIGS. 13 and 14, the display 55 is disposed so as to be substantially horizontal and extending in a front and back direction. The display area 56 for displaying real images is disposed at the back of the display 55 and the display area 57 for displaying virtual images is disposed in front of the display area 56, i.e., at the driver's side, with a certain interval between each other. Also, the display area 58 for displaying virtual images (i.e., a second display area for displaying virtual images) is disposed in the vicinity of corners of the display area 56 close to the driver's side.

The total reflection mirror 60, which reflects the display content on the display area 56 for displaying real images towards the driver, is disposed above the display area 56 with a certain inclined angle, and the half mirror 61, which reflects the display content on the display area 57 for displaying virtual images towards the driver, is disposed above the display area 57 with a certain inclined angle. Further, the half mirrors 62, which reflect the display content on the display area 58 for displaying virtual images towards the driver, are disposed above the display area 58 with a certain inclined angle.

In this case, information displayed on the half mirrors 62 via the display area 58 for displaying virtual images includes secondary information, such as information on the remaining amount of fuel, incoming mobile phone mail, and mileage.

By using the display unit having the above configuration, it also becomes possible to clarify information data required to be read or understood by the driver by displaying internal information data including at least a vehicle speed information, i.e., the information data particularly required to be read or understood by the driver, using real images, and external information data including at least information on a car in front, i.e., information which may be better sensuously understood by the driver, using virtual images.

Also, since real images and virtual images are displayed by using the display 55 having the display area 56 for displaying real images and the display area 57 for displaying virtual images, which is disposed at the driver side of the display area 56, respectively, only one display 55 is necessary. Accordingly, cost required for the display unit 54 may be reduced.

Further, since the display area 58 for displaying virtual images is disposed in the vicinity of the corners of the display area 56 for displaying real images, and the half mirrors 62 which reflect the display content on the display area 58 are also provided, it becomes possible to increase the variation of displaying virtual images.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A display device for a vehicle, comprising:
    a display unit which is capable of displaying a three dimensional image by shifting a position of a real image and a position of a virtual image in a front and back direction; and
    a total control unit which controls a display content of said display unit, comprising:
        a vehicle condition determination unit which determines the condition of the vehicle based on internal information data including at least vehicle speed information and external information data including at least information on another vehicle running in front of the vehicle;
        an information selection unit which selects information data to be displayed on said display unit from the internal information data and the external information data based on the condition of the vehicle determined by said vehicle condition determination unit; and
        a display control unit which displays internal information data selected by said information selection unit on said display unit using real images, and external information data selected by said information selection unit on said display unit using virtual images.

2. A display device for a vehicle according to claim 1, wherein said display unit displays the real images in front of the virtual images.

3. A display device for a vehicle according to claim 1, wherein said display unit comprises:
    a first display which displays a real image;
    a half mirror which is disposed at a driver side with respect to said first display;
    a total reflection mirror which is disposed below and in the vicinity of said half mirror; and
    a second display which is disposed at the driver side with respect to said total reflection mirror and displays virtual images on said half mirror by projecting images onto said total reflection mirror.

4. A display device for a vehicle according to claim 2, wherein said display unit comprises:
    a first display which displays a real image;
    a half mirror which is disposed at a driver side with respect to said first display;
    a total reflection mirror which is disposed below and in the vicinity of said half mirror;
    a second display which is disposed at the driver side with respect to said total reflection mirror and displays virtual images on said half mirror by projecting images onto said total reflection mirror.

5. A display device for a vehicle according to claim 1, wherein said display unit comprises:
    a display which includes a display area for displaying real images and a display area for displaying virtual images, said display area for displaying virtual images being disposed at a driver side with respect to said display area for displaying real images;
    a total reflection mirror which reflects a display content of said display area for displaying real images; and
    a half mirror which reflects a display content of said display area for displaying virtual images.

6. A display device for a vehicle according to claim 4, further comprising:
    a second display area for displaying virtual images, which is disposed in the vicinity of a corner of said display area for displaying real images; and
    a second half mirror which reflects a display content of said second display area for displaying virtual images.

7. A display device for a vehicle according to claim 1, wherein
    said display control unit controls, when only internal information data selected by said information selection unit is displayed on said display unit by said display control unit using real images and this display state is changed to contain external information data in addition to the internal information data, so that a display position of the internal information data is shifted with respect to a display position of the external information data.

8. A display device for a vehicle according to claim 2, wherein
    said display control unit controls, when only internal information data selected by said information selection unit is displayed on said display unit by said display control unit using real images and this display state is changed to contain external information data in addition to the internal information data, so that a display position of the internal information data is shifted with respect to a display position of the external information data.

9. A display device for a vehicle according to claim 3, wherein
    said display control unit controls, when only internal information data selected by said information selection unit is displayed on said display unit by said display control unit using real images and this display state is changed to contain external information data in addition to the internal information data, so that a display position of the internal information data is shifted with respect to a display position of the external information data.

10. A display device for a vehicle according to claim 4, wherein
    said display control unit controls, when only internal information data selected by said information selection unit is displayed on said display unit by said display control unit using real images and this display state is changed to contain external information data in addition to the internal information data, so that a display position of the internal information data is shifted with respect to a display position of the external information data.

11. A display device for a vehicle according to claim 5, wherein said display control unit controls, when only internal information data selected by said information selection unit is displayed on said display unit by said display control unit using real images and this display state is changed to contain external information data in addition to the internal information data, so that a display position of the internal information data is shifted with respect to a display position of the external information data.

12. A display device for a vehicle according to claim 6, wherein said display control unit controls, when only internal information data selected by said information selection unit is displayed on said display unit by said display control unit using real images and this display state is changed to contain external information data in addition to the internal information data, so that a display position of the internal information data is shifted with respect to a display position of the external information data.

\* \* \* \* \*